US008223308B2

(12) United States Patent
Zhao et al.

(10) Patent No.: US 8,223,308 B2
(45) Date of Patent: Jul. 17, 2012

(54) METHOD AND DEVICE FOR DISPENSING SEALANT AND LCD PANEL

(75) Inventors: Haiyu Zhao, Beijing (CN); Jingjing Liang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 525 days.

(21) Appl. No.: 12/539,697

(22) Filed: Aug. 12, 2009

(65) Prior Publication Data

US 2010/0039605 A1    Feb. 18, 2010

(30) Foreign Application Priority Data

Aug. 14, 2008  (CN) .......................... 2008 1 0118361

(51) Int. Cl.
*G02F 1/1339* (2006.01)
*B67B 7/00* (2006.01)
*B67D 7/78* (2010.01)

(52) U.S. Cl. .......... 349/153; 349/190; 222/1; 222/145.1
(58) Field of Classification Search .................. 349/153, 349/190; 222/1, 145.1
See application file for complete search history.

(56) References Cited

U.S. PATENT DOCUMENTS

| 7,295,279 | B2 * | 11/2007 | Byun et al. | 349/187 |
| 7,701,548 | B2 * | 4/2010 | Ryu et al. | 349/190 |
| 7,858,159 | B2 * | 12/2010 | Arai et al. | 428/1.5 |
| 7,880,854 | B2 * | 2/2011 | Kondo et al. | 349/153 |

FOREIGN PATENT DOCUMENTS

| JP | 60-232530 A | 11/1985 |
| JP | 60232530 A * | 11/1985 |
| KR | 20060133339 A | 12/2006 |
| KR | 20070046421 A | 5/2007 |

* cited by examiner

*Primary Examiner* — Mike Qi
(74) *Attorney, Agent, or Firm* — Ladas & Parry LLP

(57) ABSTRACT

The method for dispensing sealant comprises: preparing an inner-side sealant that comprises a light curing sealant or a first mixture of a light curing sealant and a thermal curing sealant in which the content of the light curing sealant is more than that of the thermal curing sealant; preparing an outer-side sealant that comprises a thermal curing sealant or a second mixture of a light curing sealant and a thermal curing sealant in which the composition of the light curing sealant is less than or equal to that of the thermal curing sealant; simultaneously dispensing the inner-side sealant and the outer-side sealant onto a substrate along four edges of the substrate by using a device for dispensing sealant so that one side of the inner-side sealant abuts the sealed liquid crystal materials and the other side thereof integrates with the outer-side sealant.

13 Claims, 4 Drawing Sheets

METHOD AND DEVICE FOR DISPENSING SEALANT AND LCD PANEL

BACKGROUND

Embodiments of the present invention relate to a method and a device for dispensing sealant and a liquid crystal display (LCD) panel.

Recently, liquid crystal displays (LCDs) have being replacing cathode ray tube (CRT) displays and prevailing in the market of displays for televisions, computers and the like due to the characteristics of small volume, occupying relatively small space, etc. A LCD panel is formed by attaching an array substrate to a color filter substrate with a space therebetween and liquid crystal materials are disposed within the space. Generally, when the array substrate is attached to the color filter substrate, sealant is used to maintain the airproof state of the space between the array substrate and the color filter substrate and enclose liquid crystal materials within the space between the array substrate and the color filter substrate without exposing to exterior environment, and thus the cell gap between the substrates can be maintained and the reliability of the liquid crystal display can be sustained.

The sealant mainly comprises resin and can be of thermal curing type or light curing type. The thermal curing sealant has higher adhesion strength but longer curing time; in contrast, the light curing sealant has lower adhesion strength but shorter curing time. Generally, these two types of sealants are used in mixture based on their different characteristics, that is, in a form of a mixture sealant, which can be obtained by uniformly mixing the thermal curing sealant and the light curing sealant by stirring.

FIG. 1 is a schematic view showing a structure of a conventional LCD panel, and FIG. 2 is a sectional view thereof. The conventional LCD panel 100 comprises common transfer members 1, a sealant member 2, a liquid crystal layer 3, an array substrate 5, a color filter substrate 4, and spacers 6. The sealant member 2 is arranged along the four edges of the LCD panel 100 to prevent leakage of the liquid crystal materials of the liquid crystal layer 3 and assist in maintaining the cell gap of the panel. FIG. 3 is a schematic view showing a dispenser head of a conventional dispensing device for dispensing sealant. As shown in FIG. 3, only one channel 19 is provided in the dispenser head of the conventional dispensing device. FIG. 4 is a sectional view showing a configuration of a conventional sealant member, and as shown in FIG. 4, only a sealant member with uniform composition can be obtained by using the dispenser head.

The cell process for large-sized LCD panels comprises the steps of dropping liquid crystal materials, dispensing sealant, vacuum aligning, ultraviolet curing or thermal curing, and the like. Before the vacuum aligning process, the liquid crystal materials and the sealant are applied onto the array substrate and the color filter substrate, respectively; after the ultraviolet curing process, the distance between the liquid crystal materials and the sealant becomes quite small; during or after the above thermal curing process, the liquid crystal materials and the sealant may contact with each other. In the conventional LCD panel, the sealant has a homogenous configuration. In this case, longer curing time is necessary when thermal curing sealant is used, and lower adhesion strength is exhibited when light curing sealant is used although the curing time is reduced. The liquid crystal materials and the sealant may contaminate each other even when a mixture sealant is used. In addition, when sealant that is not completely cured contacts with the liquid crystal materials, a chemical reaction may occur therebetween, and thus impurities may be introduced, in which case problems of bright pixel, light leakage, image sticking and the like may occur due to the impurities when the LCD panel is used to display an image.

SUMMARY OF THE INVENTION

A method for dispensing sealant is provided in an embodiment of the present invention. The method comprises the steps of: preparing an inner-side sealant that comprises a light curing sealant or a first mixture of a light curing sealant and a thermal curing sealant in which the content of the light curing sealant is more than that of the thermal curing sealant; preparing an outer-side sealant that comprises a thermal curing sealant or a second mixture of a light curing sealant and a thermal curing sealant in which the composition of the light curing sealant is less than or equal to that of the thermal curing sealant; and simultaneously dispensing the inner-side sealant and the outer-side sealant onto a substrate along four edges of the substrate by using a device for dispensing sealant so that one side of the inner-side sealant abuts the sealed liquid crystal materials and the other side thereof integrates with the outer-side sealant.

A liquid crystal display device is further provided in another embodiment of the present invention. The liquid crystal display device comprises an array substrate and a color filter substrate. The array substrate is attached with the color filter substrate through a sealant member and liquid crystal materials are held in a space between the array substrate and the color filter substrate. The sealant member has an integral sealant configuration comprising an inner-side sealant and an outer-side sealant, one side of the inner-side sealant abuts the sealed liquid crystal materials and the other side thereof integrates with the outer-side sealant. The inner-side sealant comprises a light curing sealant or a first mixture of a light curing sealant and a thermal curing sealant in which the content of the light curing sealant is more than that of the thermal curing sealant, and the outer-side sealant comprises a thermal curing sealant or a second mixture of a light curing sealant and a thermal curing sealant in which the composition of the light curing sealant is less than or equal to that of the thermal curing sealant.

A device for dispensing sealant is provided in further another embodiment of the present invention. The device for dispensing sealant comprises a dispenser head. The dispenser head comprises: an inner-side sealant inlet, an outer-side sealant inlet, a first channel for holding an inner-side sealant, a second channel for holding an outer-side sealant and a nozzle. The first channel is communicated with the inner-side sealant inlet, the second channel is communicated with the outer-side sealant inlet, and the nozzle is communicated the outlets of the first channel and the second channel at the bottom end of the dispenser head.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Embodiments of the present invention will be described hereinafter in detail with reference to the accompanying drawings.

Figure 5:
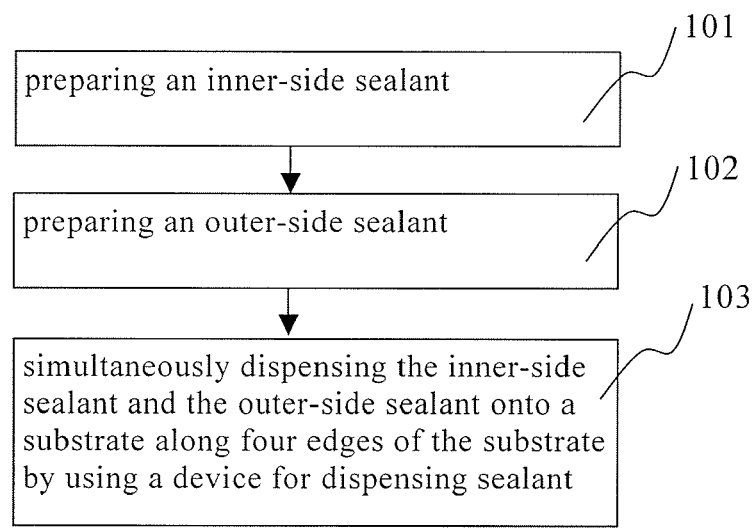
FIG. 5 is a flow chart showing a method for dispensing sealant according to an embodiment of the present invention.

FIG. 5 is a flow chart showing an embodiment of a method for dispensing sealant according to the present invention, and as shown in FIG. 5, the method for dispensing the sealant according to the embodiment of the present invention comprises the following steps:

step 101 of preparing an inner-side sealant;

step 102 of preparing an outer-side sealant; and step 103 of simultaneously dispensing the inner-side sealant and the outer-side sealant onto a substrate along four edges of the substrate by using a device for dispensing sealant so that one side of the inner-side sealant abuts the sealed liquid crystal materials and the other side thereof integrates with the outer-side sealant.

In the conventional technology, only a homogeneous sealant configuration with uniform composition is formed when a thermal curing sealant or a light curing sealant is used, and even when a mixture sealant is used because the mixture sealant is formed by uniformly mixing a thermal curing sealant and a light curing sealant. However, in the embodiment of the present invention, the sealant comprises two different parts, i.e., the inner-side sealant part and the outer-side sealant part. In addition, the inner-side sealant and the outer-side sealant can be one of a thermal curing sealant, a light curing sealant, and a mixture sealant, but are different from each other in composition. Therefore, in the embodiment of the present invention, the inner-side sealant and the outer-side sealant are separately prepared before they are dispensed.

Firstly, the inner-side sealant can be prepared. The inner-side sealant typically is a light curing sealant or a first mixture formed by mixing a light curing sealant and a thermal curing sealant. If the first mixture is used as the inner-side sealant, the content of the light curing sealant in the first mixture is adjusted so that the content of the light curing sealant is more than that of the thermal curing sealant. Since the light curing sealant advantageously has a shorter curing time, the curing time of the inner-side sealant can be reduced when the light curing sealant or the first mixture in which the content of the light curing sealant is more than that of the thermal curing sealant is used as the inner-side sealant.

Secondly, the outer-side sealant can be prepared. The outer-side sealant typically is a thermal curing sealant or a second mixture formed by mixing a light curing sealant and a thermal curing sealant. If the second mixture is used as the outer-side sealant, the content of the light curing sealant in the second mixture is adjusted so that the content of the light curing sealant is less than or equal to that of the thermal curing sealant. Since the thermal curing sealant advantageously has higher adhesion strength, the adhesion strength of the outer-side sealant can be improved when the thermal curing sealant or the second mixture in which the content of the thermal curing sealant is larger than that of the light curing sealant is used for the outer-side sealant.

It should be noted that both the first mixture and the second mixture are mixture sealants of the light curing sealant and the thermal curing sealant, and the first mixture is used for the inner-side sealant and the second mixture is used for the outer-side sealant throughout the description hereinafter.

Then, two substrates are attached together to form a cell therebetween. In the present embodiment, the substrate dispensed with the sealants may be an array substrate or a color filter substrate. Specifically, the inner-side sealant and the outer-side sealant are simultaneously dispensed onto the array substrate or the color filter substrate along the four edges so that one side of the inner-side sealant abuts the sealed liquid crystal materials and the other side thereof integrates with the outer-side sealant. That is, the inner-side sealant is the part of the formed sealant member abutting the liquid crystal materials and the outer-side sealant is the part away from the liquid crystal materials. The two sealant parts are arranged on the basis of characteristics of the thermal curing sealant and the light curing sealant. The curing time of the part abutting the liquid crystal materials can be reduced when the inner-side sealant comprises the light curing sealant with a shorter curing time or the first mixture in which the content of the light curing sealant is more than that of the thermal curing sealant, so that the contamination between the sealant member and the liquid crystal materials resulting from the incomplete curing of the sealant can be decreased. On the other hand, the adhesion strength of the part away from the liquid crystal materials can be improved when the outer-side sealant comprises the thermal curing sealant with higher adhesion strength or the second mixture in which the content of the thermal curing sealant is larger than that of the light curing sealant, so that the seal state of the two substrates can be improved and the contact of the liquid crystal materials with the exterior environment can prevented.

Preferably, the step 103 of simultaneously dispensing the inner-side sealant and the outer-side sealant onto the substrate along the four edges by using a device for dispensing sealant may comprise the steps of: injecting the inner-side sealant and the outer-side sealant into the dispensing device respectively through an inner-side sealant inlet and an outer-side sealant inlet of the dispensing device; extruding the inner-side sealant and the outer-side sealant out of a nozzle respectively through a first channel and a second channel of the dispensing device; and simultaneously dispensing the inner-side sealant and the outer-side sealant onto the substrate along the four edges. That is, the inner-side sealant and the outer-side sealant are simultaneously rather than separately dispensed to form an integral configuration. Due to the integral configuration formed by simultaneously dispensing the inner-side sealant and the outer-side sealant, there is no gap formed between the inner-side sealant and the outer-side sealant, and thus problems (e.g. a problem associated with pressure) causing by the gap can be prevented. In addition, the structure of the above-described dispensing device will be explained in detail in another embodiment of the present invention.

Furthermore, the volume ratio of the inner-side sealant to the outer-side sealant is about 1:3 to about 1:1. Specifically, in the integral configuration formed by simultaneously dispensing the inner-side sealant and the outer-side sealant, the volume ratio of the inner-side sealant to the outer-side sealant is in the range of about 1:3 to about 1:1, that is, the inner-side sealant volume constitutes at least 25% and at most 50% of the total sealant volume.

Figure 4:
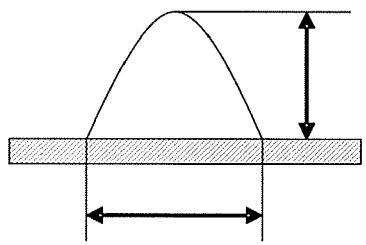
FIG. 4 is a sectional view showing a configuration of a conventional sealant member after the sealant is dispensed.
Figure 6:
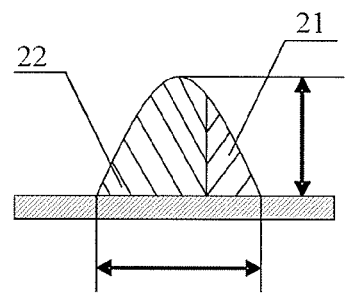
FIG. 6 is a sectional view showing a sealant configuration after the sealant is dispensed in the embodiment of the present invention.

FIG. 6 is a sectional view showing a sealant configuration after the sealant is dispensed in a method for dispensing sealant according to the embodiment of the present invention. Compared with the conventional homogeneous sealant configuration shown in FIG. 4, the profile of the sealant configuration obtained through the method for dispensing sealant in the embodiment is similar to that of the conventional homogeneous one, and the sectional shape of them are both similar to paraboloid. For example, the width of the sealant configuration is about 1.1 mm, and the sectional area is about 6000 $\mu m^2$. In addition, through experiments and analysis, the volume ratio of the inner-side sealant to the outer-side sealant is preferably about 1:2, that is, a preferable effect can be obtained when the inner-side sealant constitutes about 33.3% of the total sealant volume.

Furthermore, the content of the light curing sealant in the first mixture is at least 70% in the present embodiment. In order to avoid the contamination between the sealant member and the liquid crystal materials, the inner-side sealant comprises the light curing sealant or the first mixture in which the content of the light curing sealant is at least 70% so as to reduce the curing time of the inner-side sealant. In addition, in the present embodiment, the content of the light curing sealant in the second mixture is below 50% and preferably about 40%. In order to improve the adhesion strength of the integral sealant configuration when the inner-side sealant comprises the light curing sealant or the first mixture, the outer-side sealant comprises the thermal curing sealant or the second mixture in which the content of the light curing sealant is below 50% and preferably about 40%.

According to the present embodiment, the sealant member comprises the inner-side sealant and the outer-side sealant. Specifically, the inner-side sealant comprises the light curing sealant or the first mixture in which the content of the light curing sealant is more than that of the thermal curing sealant, and thus the curing time of that part abuts the liquid crystal materials can be reduced and the contamination between the sealant member and the liquid crystal materials resulting from the incomplete curing of the sealant can be prevented. Meanwhile, the outer-side sealant comprises the thermal curing sealant or the second mixture in which the content of the thermal curing sealant is larger than that of the light curing sealant and thus the adhesion strength of the part away from the liquid crystal materials can be improved. Therefore, with the method for dispensing sealant in the present embodiment, satisfactory adhesion strength and reduced curing time can be obtained at the same time. However, in the conventional technology, if a light curing sealant is used for the sealant member on a substrate, shorter curing time can be obtained but the adhesion strength is reduced; if a thermal curing sealant is used for the sealant member on a substrate, higher adhesion strength can be obtained but the curing time is longer; and if a mixture sealant, for example, in which the content of a light curing sealant is about 70%, is used for the sealant on a substrate, since the mixture sealant is formed by uniformly mixing a thermal curing sealant and a light curing sealant, that is, both the side abutting the liquid crystal materials and the side away from the liquid crystal materials have the same content (e.g., 70%) of the light curing sealant, the curing time of the side abutting the liquid crystal materials is reduced but the integral adhesion strength can not be ensured.

In the method for dispensing sealant of the present embodiment, the inner-side sealant and the outer-side sealant are separately prepared and simultaneously dispensed onto the substrate for the sealant member. Since the inner-side sealant comprises the light curing sealant or the first mixture in which the content of the light curing sealant is more than that of the thermal curing sealant, the curing time of the integral sealant configuration can be reduced, and thus the contamination between the sealant member and the liquid crystal materials can be decreased and the problems such as bright pixel, light leakage, image sticking and the like can be avoided. In addition, since the outer-side sealant comprises the thermal curing sealant or the second mixture in which the content of the thermal curing sealant is larger than that of the light curing sealant, the adhesion strength of the integral sealant configuration can be improved.

Figure 7:
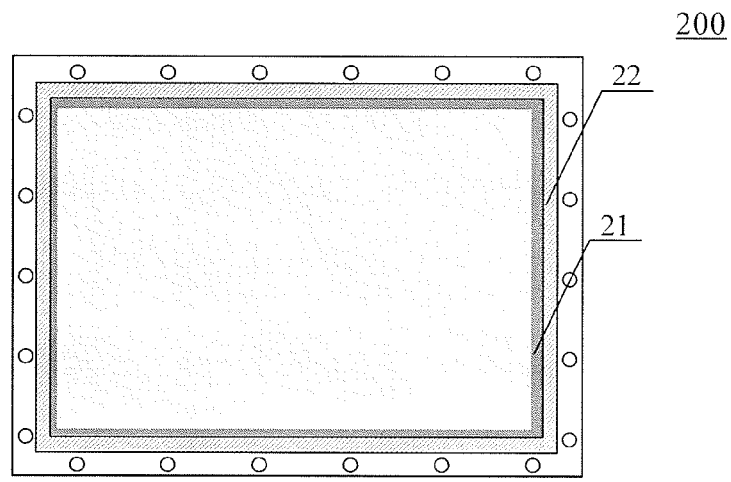
FIG. 7 is a structural schematic view showing a LCD panel according to an embodiment of the present invention.
Figure 8:
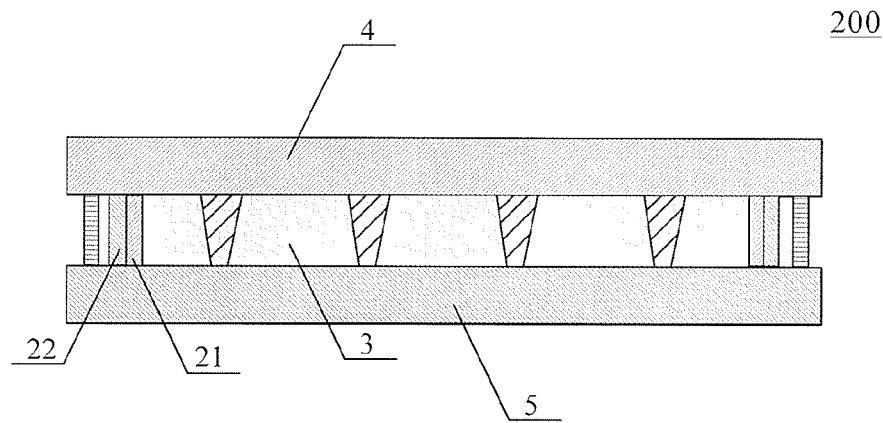
FIG. 8 is a sectional view showing the LCD panel in FIG. 7.

FIG. 7 is a structural schematic view showing a LCD panel according to an embodiment of the present invention and FIG. 8 is a sectional view of the LCD panel in FIG. 7. As shown in FIG. 7 and FIG. 8, the LCD panel 200 in the present embodiment comprises an array substrate 5, a color filter substrate 4, a sealant member 2 and a liquid crystal layer 3. The sealant member 2 comprises an inner-side sealant part 21 and an outer-side sealant part 22. The inner-side sealant part 21 and the outer-side sealant part 22 comprises one of a thermal curing sealant, a light curing sealant, and a mixture sealant formed by uniformly mixing a thermal curing sealant and a light curing sealant, but they are different from each other in composition. In the present embodiment, the sealant member 2 is of an integral sealant configuration and obtained by simultaneously dispensing the inner-side sealant and the outer-side sealant. One side of the inner-side sealant part 21 abuts the sealed liquid crystal materials and the other side thereof integrates with the outer-side sealant part 22. The inner-side sealant part 21 comprises a light curing sealant or a first mixture of a light curing sealant and a thermal curing sealant in which the content of the light curing sealant is more than that of the thermal curing sealant, and the outer-side sealant part 22 comprises a thermal curing sealant or a second mixture of a light curing sealant and a thermal curing sealant in which the content of the light curing sealant is less than or equal to that of the thermal curing sealant.

Furthermore, the volume ratio of the inner-side sealant to the outer-side sealant is about 1:3 to about 1:1. Specifically, in the integral sealant configuration formed by dispensing the inner-side sealant and the outer-side sealant simultaneously, the volume ratio of the inner-side sealant to the outer-side sealant is in the range of about 1:3 to about 1:1, that is, the inner-side sealant volume constitutes at least 25% and at most 50% of the total sealant volume.

Furthermore, the content of the light curing sealant in the first mixture is at least 70%; and the content of the light curing sealant in the second mixture is below 50% and preferably about 40%.

In the LCD panel of the present embodiment, the sealant member is provided as an integral sealant configuration comprising the inner-side sealant part and the outer-side sealant part, and the composition of the inner-side sealant and the outer-side sealant are determined based on the characteristics of the light curing sealant and the thermal curing sealant, respectively. Since the inner-side sealant comprises a light curing sealant or a first mixture sealant in which the content of the light curing sealant is more than that of the thermal curing sealant, the curing time of the integral sealant configuration may be reduced, and thus the contamination between the sealant member and the liquid crystal materials can be decreased and the problems of bright pixel, light leakage, image sticking and the like can be avoided. In addition, since the outer-side sealant comprises the thermal curing sealant or a second mixture in which the content of the thermal curing sealant is larger than that of the light curing sealant, the adhesion strength of the integral sealant configuration can be improved.

Figure 1:
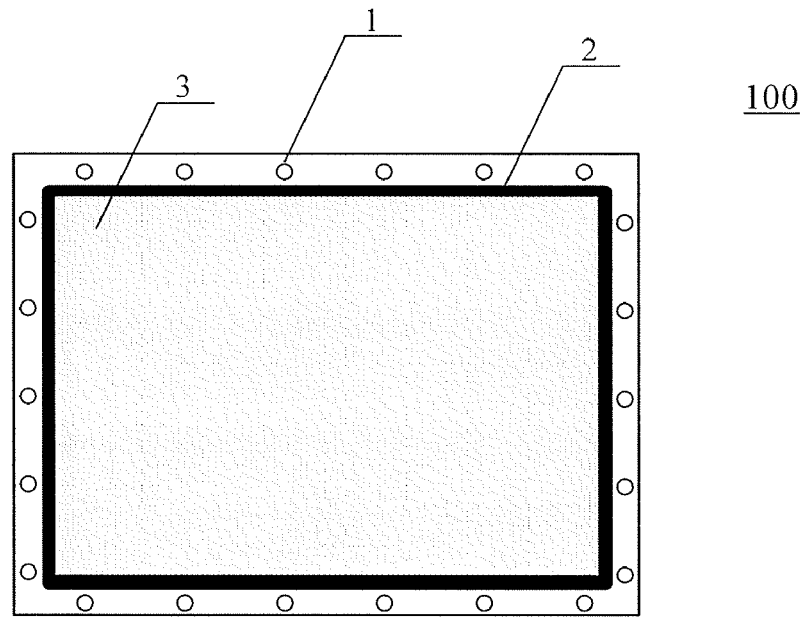
FIG. 1 is a structural schematic view showing a conventional LCD panel.
Figure 2:
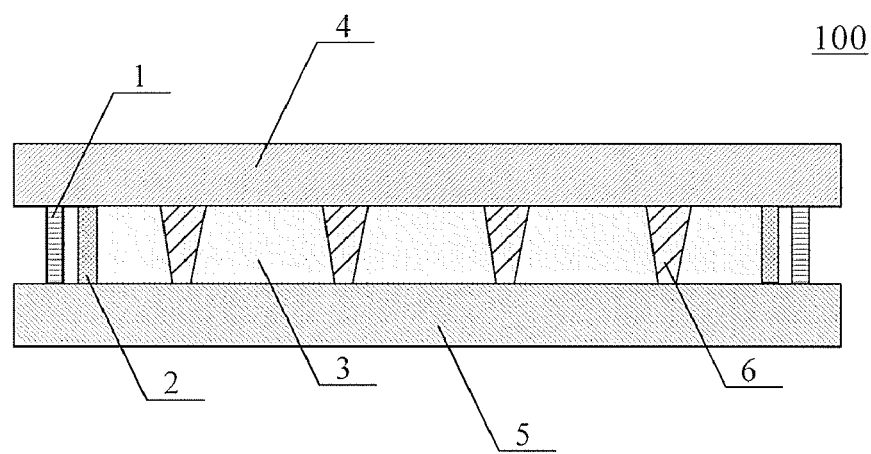
FIG. 2 is a sectional view showing the conventional LCD panel in FIG. 1.
Figure 3:
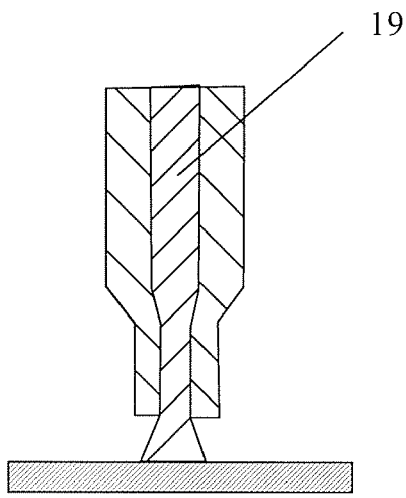
FIG. 3 is a structural schematic view showing a dispenser head of a conventional dispensing device for dispensing sealant.
Figure 9:
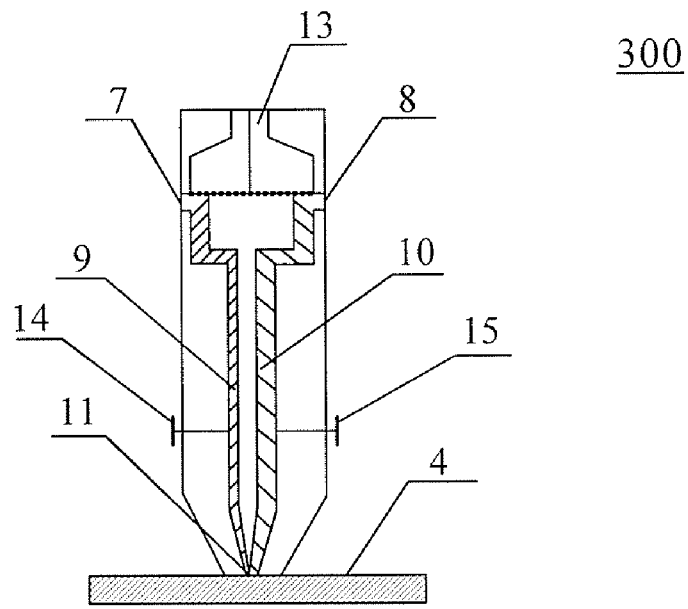
FIG. 9 is a sectional view showing a dispenser head according to an embodiment of the present invention.

FIG. 9 is a sectional view showing a dispenser head according to an embodiment of the present invention. The device 300 for dispensing sealant comprises a dispenser head, the structure of which is similar to that of a die for co-extruding plastics in an extrusion device. Generally, the inner diameter of the dispenser head may be about 0.3 mm to about 0.5 mm, and the width of the sealant member dispensed on the substrate is about 1 mm because the extruded material swells after leaving the die. As shown in FIG. 9, the dispenser head in the device for dispensing sealant according to the present embodiment is different from that in the conventional head shown in FIG. 3 and comprises an inner-side sealant inlet 7, an outer-side sealant inlet 8, a first channel 9 for containing the inner-side sealant, a second channel 10 for containing the outer-side sealant and a nozzle 11. The first channel 9 is communicated with the inner-side sealant inlet 7, the second channel 10 is communicated with the outer-side sealant inlet 8, and the nozzle 11 is communicated with the outlets of the first channel 9 and the second channel 10 at the bottom end of the dispenser head. After the inner-side sealant and the outer-side sealant are prepared, respectively, the inner-side sealant is injected into the first channel 9 through the inner-side sealant inlet 7 and the outer-side sealant is injected into the second channel 10 through the outer-side sealant inlet 8. Then, under the application of pressure, the inner-side sealant reaches the outlet at the bottom of first channel 9 and the outer-side sealant reaches the outlet at the bottom of the second channel 10, so that they can be extruded out of the nozzle 11 and dispensed on an array substrate or a color filter substrate.

The dispenser head in the device for dispensing sealant of the present embodiment may further comprise a first regulating valve 14 for regulating the section area of the outlet of the first channel 9 and a second regulating valve 15 for regulating the section area of the outlet of the second channel 10. Specifically, the first regulating valve 14 is provided in the vicinity of the outlet of the first channel 9, and the second regulating valve 15 is provided in the vicinity of the outlet of the second channel 10. The section area of the outlet first channel 9 is regulated by the first regulating valve 14, and the section area of the outlet second channel 10 is regulated by the second regulating valve 15, so the area ratio of the sections is about 1:3 to about 1:1, and thus the volume ratio of the inner-side sealant to the outer-side sealant respectively extruded through the first channel 9 and the second channel 10 is about 1:3 to about 1:1. The volume ratio of the inner-side sealant to the outer-side sealant is about 1:3 when the area ratio of The section area of the outlet first channel 9 and that of the second channel 10 is about 1:3; the volume ratio of the inner-side sealant to the outer-side sealant is about 1:1 when the area ratio of The section area of the outlet first channel 9 and that of the second channel 10 is about 1:1.

Furthermore, the dispenser head in the device for dispensing sealant of the present embodiment may comprises a pressure chamber 13 provided at the top end of the dispenser head. The pressure chamber 13 may have two sub-chambers, which are respectively communicated with the first channel 9 and the second channel 10 at their lower ends. The pressure in each of the first channel 9 and the second channel 10 is controlled by the two sub-chambers in the pressure chamber 13, respectively, so that the inner-side sealant contained in the first channel 9 and the outer-side sealant contained in the second channel 10 can be extruded and dispensed on the substrate.

There is provided a device for dispensing sealant in the present embodiment, the dispenser head of which is provided so that the inner-side sealant is contained in the first channel and the outer-side sealant is contained in the second channel. Therefore, a sealant member of an integral sealant configuration comprising the inner-side sealant and the outer-side sealant is formed after the inner-side sealant and the outer-side sealant are simultaneously dispensed, and thus satisfactory adhesion strength can be produced, and at the same time a reduced curing time can be obtained. Furthermore, the contamination between the sealant member and the liquid crystal materials can be decreased and the problems of bright pixel, light leakage, image sticking and the like can be avoided.

Figure 10:
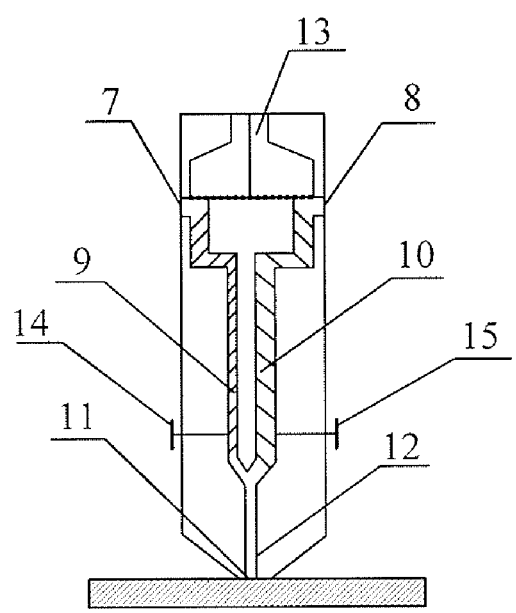
FIG. 10 is a sectional view showing a dispenser head according to a second embodiment of the present invention.

FIG. 10 is a sectional view showing a dispenser head of a device for dispensing sealant according to a second embodiment of the present invention. The difference between the device 400 for dispensing sealant in FIG. 10 and the device 300 for dispensing sealant shown in FIG. 9 lies in that the device 400 further comprises a mixing chamber 12 in the dispenser head. The mixing chamber 12 is communicated with the first channel 9 and the second channel 10 at its upper end and communicated with the nozzle 11 at its lower end. In the present embodiment, the inner-side sealant is injected into the first channel 9 through the inner-side sealant inlet 7 and the outer-side sealant is injected into the second channel 10 through the outer-side sealant inlet 8, and then they meet in the mixing chamber 12 and finally dispensed on the substrate through the nozzle 11. By providing the mixing chamber 12 in the present embodiment, the inner-side sealant and the outer-side sealant are integrated with each other before they are dispensed, and thus the attaching degree between them is improved and integrity of the integral sealant configuration comprising the inner-side sealant and the outer-side sealant is improved as well.

There is also provided a device for dispensing sealant in the present embodiment, the dispenser head of which is provided so that an additional mixing chamber is formed in the dispenser head and thus the integrity of the integral sealant configuration comprising the inner-side sealant and the outer-side sealant is further improved. Therefore, satisfactory adhesion strength can be produced, and at the same time a reduced curing time can be obtained. In addition, the contamination between the sealant member and the liquid crystal materials can be decreased and the problems of bright pixel, light leakage, image sticking and the like can be avoided.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A method for dispensing sealant, comprising:
preparing an inner-side sealant, wherein the inner-side sealant comprises a light curing sealant or a first mixture of a light curing sealant and a thermal curing sealant in which the content of the light curing sealant is more than that of the thermal curing sealant;

preparing an outer-side sealant, wherein the outer-side sealant comprises a thermal curing sealant or a second mixture of a light curing sealant and a thermal curing sealant in which the composition of the light curing sealant is less than or equal to that of the thermal curing sealant; and simultaneously dispensing the inner-side sealant and the outer-side sealant onto a substrate along four edges of the substrate by using a device for dispensing sealant so that one side of the inner-side sealant abuts the sealed liquid crystal materials and the other side thereof integrates with the outer-side sealant.

2. The method for dispensing sealant according to claim 1, wherein the step of simultaneously dispensing the inner-side sealant and the outer-side sealant onto a substrate along four edges of the substrate by using a device for dispensing sealant comprises:

injecting the inner-side sealant and the outer-side sealant into the dispensing device respectively through an inner-side sealant inlet and an outer-side sealant inlet of the dispensing device;

extruding the inner-side sealant and the outer-side sealant out of a nozzle respectively through a first channel and a second channel of the dispensing device; and simultaneously dispensing the extruded inner-side sealant and outer-side sealant onto the substrate along the four edges.

3. The method for dispensing sealant according to claim 2, wherein the volume ratio of the inner-side sealant to the outer-side sealant is about 1:3 to about 1:1.

4. The method for dispensing sealant according to claim 1, wherein the content of the light curing sealant in the first mixture is at least 70%.

5. The method for dispensing sealant according to claim 1, wherein the content of the light curing sealant in the second mixture is below 50%.

6. A liquid crystal display (LCD) panel, comprising an array substrate and a color filter substrate, the array substrate being attached to the color filter substrate through a sealant member and liquid crystal materials being held in a space between the array substrate and the color filter substrate, wherein the sealant member has an integral sealant configuration comprising an inner-side sealant and an outer-side sealant, and one side of the inner-side sealant abuts the sealed liquid crystal materials and the other side thereof integrates with the outer-side sealant, wherein the inner-side sealant comprises a light curing sealant or a first mixture of a light curing sealant and a thermal curing sealant in which the content of the light curing sealant is more than that of the thermal curing sealant, and the outer-side sealant comprises a thermal curing sealant or a second mixture of a light curing sealant and a thermal curing sealant in which the composition of the light curing sealant is less than or equal to that of the thermal curing sealant.

7. The LCD panel according to claim 6, wherein the volume ratio of the inner-side sealant to the outer-side sealant is about 1:3 to about 1:1.

8. The LCD panel according to claim 6, wherein the content of the light curing sealant in the first mixture is at least 70%.

9. The LCD panel according to claim 6, wherein the content of the light curing sealant in the second mixture is below 50%.

10. A device for dispensing sealant comprising a dispenser head that comprises:
an inner-side sealant inlet,
an outer-side sealant inlet,
a first channel for holding an inner-side sealant,
a second channel for holding an outer-side sealant, and
a nozzle,
wherein the first channel is communicated with the inner-side sealant inlet, the second channel is communicated with the outer-side sealant inlet, and the nozzle is communicated the outlets of the first channel and the second channel at the bottom end of the dispenser head.

11. The device for dispensing sealant according to claim 10, wherein the dispenser head further comprises a first regulating valve for regulating the section area of the outlet of the first channel and a second regulating valve for regulating the section area of the outlet of the second channel.

12. The device for dispensing sealant according to claim 11, wherein the dispenser head further comprises a mixing chamber, and wherein the mixing chamber is communicated with the first channel and the second channel at its upper end and communicated with the nozzle at its lower end.

13. The device for dispensing sealant according to claim 12, wherein the dispenser head further comprises a pressure chamber provided at the top end of the dispenser head, and wherein the pressure chamber is communicated with the first channel and the second channel at its lower end.

* * * * *